(12) United States Patent
Huang et al.

(10) Patent No.: US 7,388,190 B2
(45) Date of Patent: Jun. 17, 2008

(54) FIBER BRAGG GRATING SENSORED SEGMENTED DEFLECTOMETER FOR GROUND DISPLACEMENT MONITORING

(75) Inventors: An-Bin Huang, Ciyueng Lin Township, Hsinchu County (TW); Yen-Te Ho, Taipei (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 11/342,927

(22) Filed: Jan. 30, 2006

(65) Prior Publication Data
US 2007/0069115 A1    Mar. 29, 2007

(30) Foreign Application Priority Data
Sep. 23, 2005    (TW) .............................. 94133010 A

(51) Int. Cl.
*G01J 1/04* (2006.01)
*G01B 5/00* (2006.01)
(52) U.S. Cl. .................................. 250/227.14; 73/784
(58) Field of Classification Search ........... 250/227.14; 73/784
See application file for complete search history.

(56) References Cited

U.S. PATENT DOCUMENTS

| | | | |
|---|---|---|---|
| 3,808,697 A * | 5/1974 | Hall .............................. | 33/312 |
| 5,337,613 A * | 8/1994 | Kovari ........................ | 73/784 |
| 6,403,949 B1 * | 6/2002 | Davis et al. ........... | 250/227.27 |
| 2005/0169568 A1 * | 8/2005 | Shang et al. .................. | 385/13 |

OTHER PUBLICATIONS

Green, G. E., and Mickkelsin, P. E., "Deformation Measurements with Inclinometers", Transportation Research Record 1169, TRB, National Research Council, Washington, D. C. (1988).
Takada, Y; Kyodai B. and Kenkyu N.,"Measurement of international strain on landslide occurring ground" No. 8, p. 586 (1965) [Annual Report of Study for Hazard Prevention in Tokyo].
Nakamura, H.; Landslides, "A study of finding landslide surface by the use of buried strain meters" vol. 6, No. 1, pp. 1-8 (1969)[Annual Report of Study for Hazard Prevention in Tokyo].
Shiang et al., "Optical Fiber Sensing Technology, and Introduction of Implanted optical Fiber Bend Meter and Test Application", Proceedings of 1 2t Non-destructive Detection Technology Symposium (2004), pp. 273-279.
Yoshida, Y., Kashiwai, Y, Murakami, E., Ishida, S., and Hashiguchi, N.,2002, "Development of the monitoring system for slope deformations", Proceedings, SPIE vol. 4694, pp. 296-302.

* cited by examiner

*Primary Examiner*—Thanh X Luu
(74) *Attorney, Agent, or Firm*—Bucknam and Archer

(57) ABSTRACT

The invention provides a monitoring device mainly for sensing ground displacement, including the fiber Bragg grating sensored deflectometer and the signal interrogator/computer system. The device uses a segmented design that consists of a flexible tube (referred to as the flexible segment) and two rigid segments and thus referred to as the double hinged FBG segmented deflectometer (DH-FBG-SD). For field installation, multiple DH-FBG-SD units are connected together to form a string as it is inserted into a grouted-in-place inclinometer casing. The distortion of the inclinometer casing induced by ground movement causes relative rotation of the inserted DH-FBG-SD. All of the DH-FBG-SD units are connected to an FBG interrogator/computer system situated on ground surface. The FBG signals are recorded and analyzed by the interrogator/computer system.

9 Claims, 9 Drawing Sheets

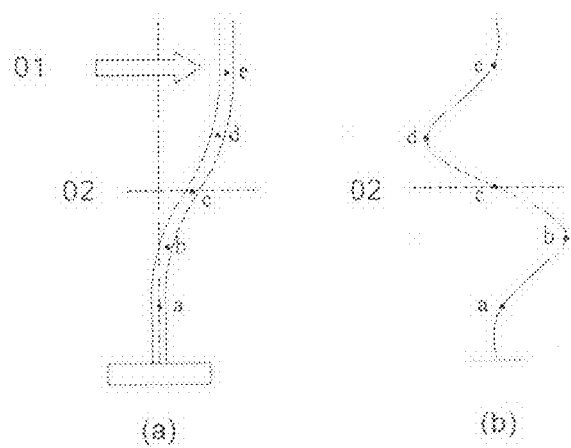
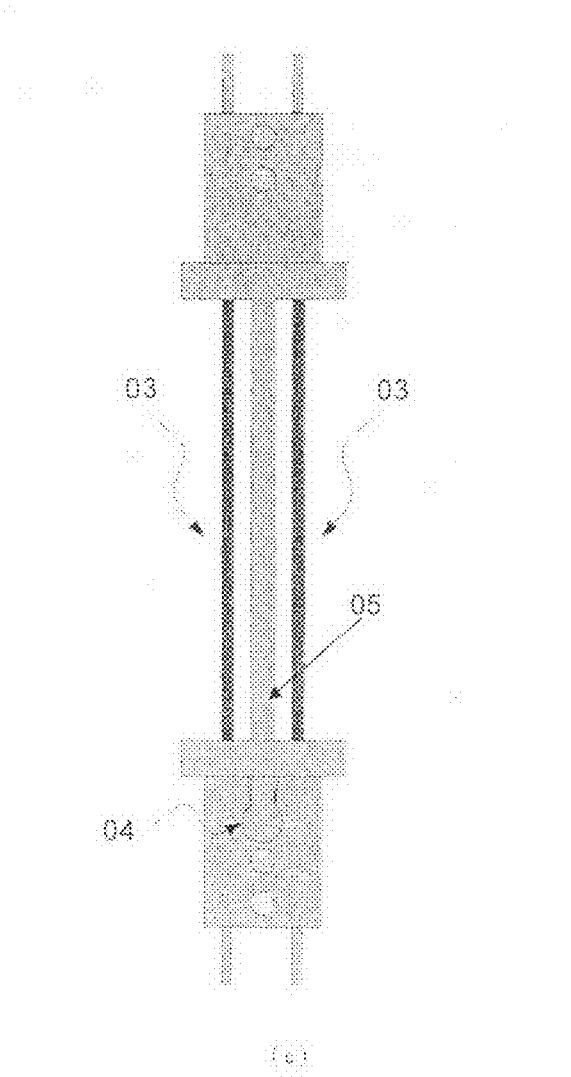
Fig. 1(a)、1(b)、1(c)
(PRIOR ART)

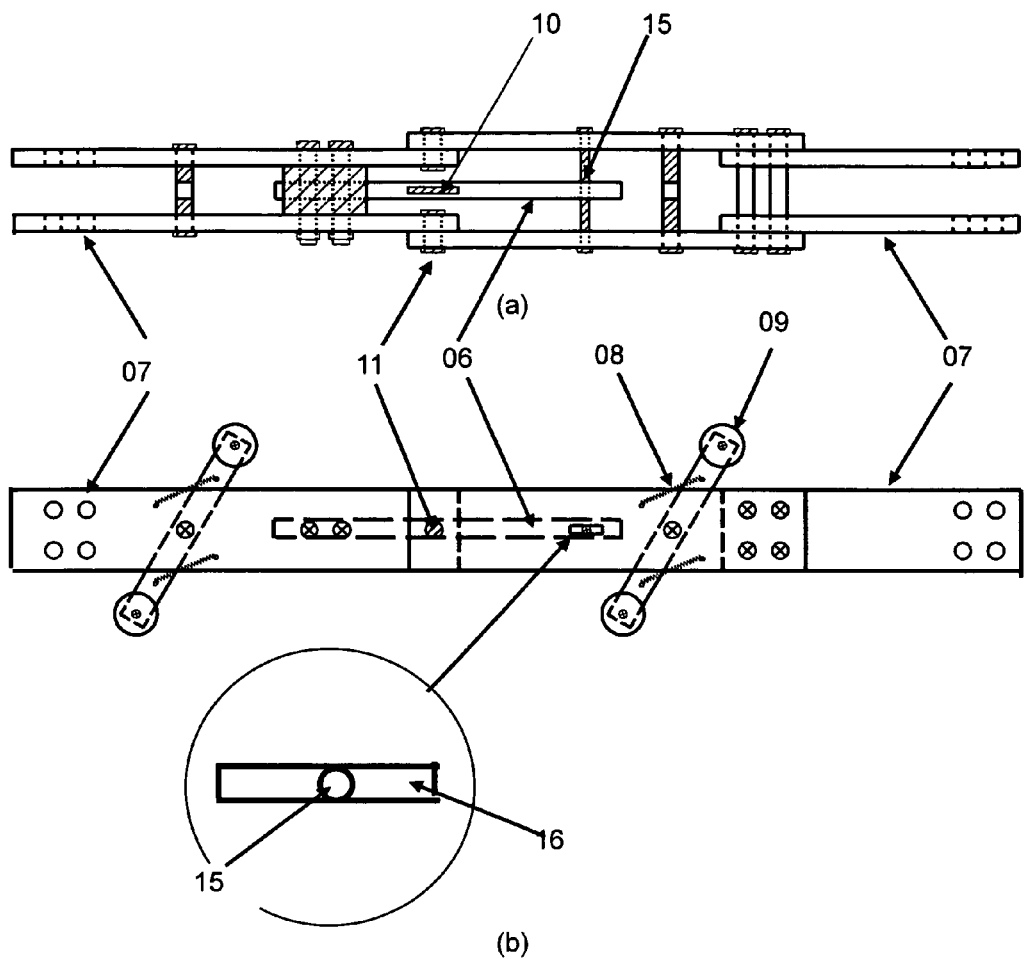
Fig. 2(a)、2(b)、2(c)

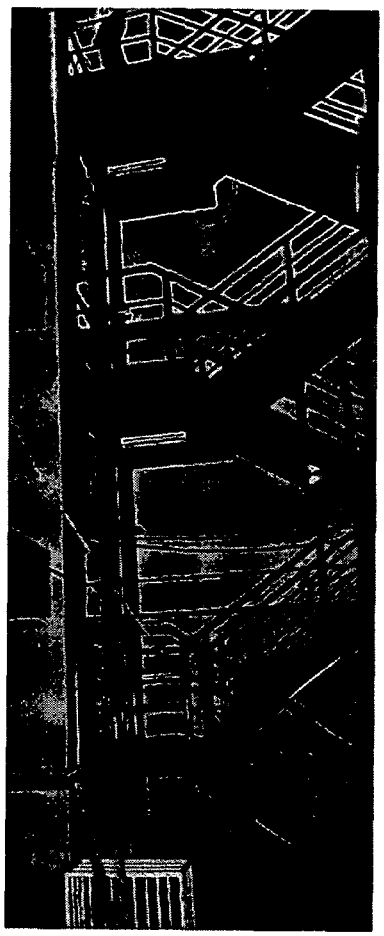
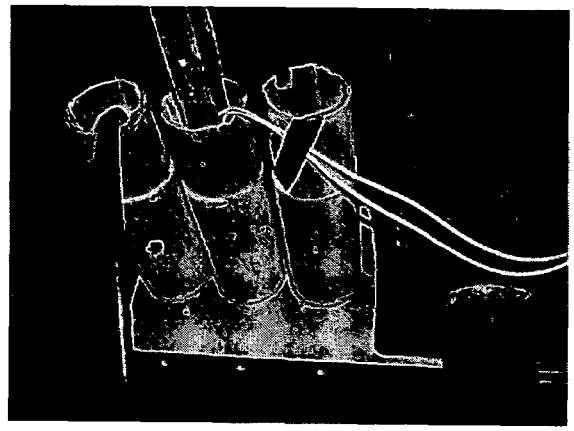
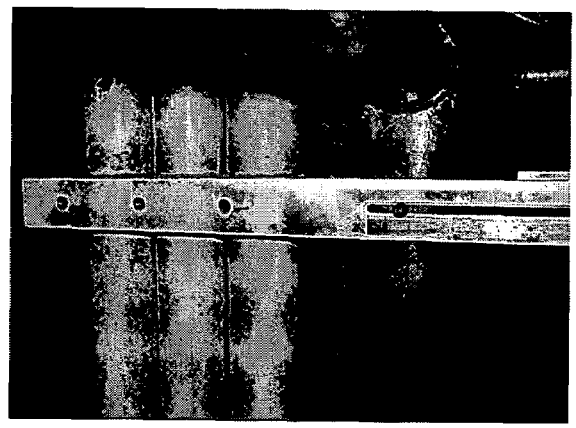
Fig.6

FIBER BRAGG GRATING SENSORED SEGMENTED DEFLECTOMETER FOR GROUND DISPLACEMENT MONITORING

BACKGROUND OF THE INVENTION

1. Field of the Invention

Generally, this invention relates to a device for monitoring deformation of natural or man-made slopes, supporting structures of ground excavation, or of long structures such as the pipeline for transferring oil, gases or water, or beams and columns of buildings, bridges or ships; wherein, the deformation is monitored by means of an automated displacement monitoring probe with high sensitivity, durability and stability. To achieve optimum performance, the diameter of the monitoring probe and its distributed density subject to the characteristics of the target can be adjusted.

2. Description of the Prior Art

According to Green, G. E., and Mickkelsen, P. E., "Deformation Measurements with Inclinometers", Transportation Research Record 1169, TRB, National Research Council, Washington, D.C. (1988), S. D. Wilson of Harvard University developed the concept of a probe inclinometer system in 1952. Today, the inclinometer system is probably the most widely used technique in the detection of ground movements. An inclinometer casing made of plastic or aluminum is installed in a near vertical position in the ground. For monitoring the stability of an earth slope, an inclinometer probe (IP) equipped with wheels that fit tightly with the grooves in the inclinometer casing is typically used to serve as the sensor unit. An electric cable raises and lowers the IP in the casing and transmits electric signals to the ground surface. The IP measures the inclination of the inclinometer casing in reference to verticality. Readings from the sensor unit are taken typically at a fixed interval of 500 mm as the probe is raised or lowered in the casing. The displacement at any depth of the casing is determined according to the IP inclination measurements. The aforementioned method is usually carried out manually which is time consuming. An in-place-inclinometer (IPI) probe is available that places the sensor probes in the ground on a long term basis and allows automated data logging. The above-described ground displacement monitoring devices use an electrical system for sensing and signal transmission. The electrical systems are prone to short circuit when exposed in a humid environment such as underground and below ground water. Most of the electrical sensors are non-distributive in nature where one transmission line is dedicated to a specific sensor. When a large number of sensors are used, the equally large number of transmission lines can make the system impractical. The electrical signals are subject to electromagnetic interference. These drawbacks make the electrical ground movement monitoring systems complicated or expensive to use.

The pipe strain gauge, which has been disclosed in Annual Report of Study for Hazard Prevention in Tokyo, the papers of Takada, Y.; Kyodai B. and Kenkyu N., "Measurement of international strain on landslide occurring ground" No. 8, P. 586 (1965) and Nakamura, H.; Landslides, "A study of finding landslide surface by the use of buried strain meters" Vol. 6, No. 1, pp. 1~8 (1969), respectively, use the principle of flexural strain caused by bending of a flexible pipe. The pipe strain gauge consists of a series of strain gauges attached to the surface of a flexible pipe. By sensing the flexural strain, the deformation distribution perpendicular to the longitudinal axis (as shown in FIGS. 1 (a) and 1 (b)) can be monitored. The pipe strain gauge may be used to determine the direction of ground movement 01 and location of the sliding surface 02 in FIGS. 1 (a) and 1 (b). The strain gauge is a non-distributive, electric sensor and thus shares similar drawbacks as the IPI.

Shiang et al., "Optical Fiber Sensing Technology, and Introduction of Implanted optical Fiber Bend Meter and Test Application", Proceedings of $12^{th}$ Non-destructive Detection Technology Symposium (2004), pp. 273~279, described a device (called the optical fiber bend meter as shown in FIG. 1 (c)) that uses a pair of stretched fiber Bragg gratings (FBG) 03 to measure ground displacement in combination with the inclinometer casing. The design of the bend meter was based on the concept reported by Yoshida, Y., Kashiwai, Y., Murakami, E., Ishida, S., and Hashiguchi, N., 2002, "Development of the monitoring system for slope deformations", Proceedings, SPIE Vol. 4694, pp. 296~302. The bearing 04 shown in FIG. 1 (c) allows rotation of the rigid column 05. The bend meter can be inserted inside an inclinometer casing. The ground movement causes bending of the inclinometer casing and that bending forces rotation of the rigid column 05 and simultaneous extension/compression of the two fiber Bragg gratings (FBG) 03. The amount of relative rotation or rotation of the bottom piece around the hinge 04, is determined by the differential elongation between the two pre-stressed optic fibers inscribed with FBG's. Because of the flexible nature of the optic fiber, the measurement mechanism is effective only if the optic fibers remain tensioned. For this reason, the FBG optic fibers in the bend meter are pre-stressed. Furthermore, the extension/compression sensed by the FBG's are not resulted only from the deflection of the bend meter. All longitudinal forces including the weight of the bend meter units and friction between the bend meter support and the grooves in the inclinometer casing can all affect the readings for such design of FIG. 1 (c). It is possible therefore, that non-repeatable and/or unpredictable errors can occur while using the bend meter to monitor ground displacement.

Though there have been many types of optic fiber sensors available commercially, these sensors are not always dedicated for ground displacement monitoring. They lack the necessary sensitivity and/or compatibility with the currently available ground displacement monitoring systems.

SUMMARY OF THE INVENTION

Because of the long history and popularity of inclinometer casings, the Double Hinged Fiber Bragg Grating Sensored Segmented Deflectometer (DH-FBG-SD) is designed to be used in a conventional inclinometer casing.

A single unit of DH-FBG-SD consists of a pair of rigid end pieces 07 in FIGS. 2(a) and (b) (referred to as the rigid segment), The two rigid end pieces are connected by a hinge 11 in FIG. 2(a) (the first hinge). A flexible tube 06 in FIGS. 2 (a) and (b) (referred to as the flexible segment) is mounted across two neighboring rigid end pieces. One end of the flexible tube is fixed (no sliding and no rotation allowed) to a rigid end piece, the other end of the flexible tube is connected to the neighboring rigid end piece by a pin 15 inserted in an elongated slot 16 in FIG. 2 (b) (the second hinge). The design is thus referred to as a double hinged segmented deflectometer. The flexible tube serves only one purpose as a carrier of strain sensors to measure the relative deflection between the rigid end pieces. The pin-in-the-slot design eliminates any longitudinal forces that may be experienced by the flexible tube. The rigid segments are equipped with spring 08 loaded braces 09 in FIG. 2 (b) so that the DH-FBG-SD can be fitted to the grooves in the inclinometer casing. Two FBG's 10 are attached to the opposite sides of the flexible tube 07 in FIG. 2 (b) to measure the flexural strain. The diameter and length of the flexible tube can be changed to adjust for the strain resolution of the DH-FBG-SD. The length of the rigid end pieces 07 in FIGS. 2 (a) and 3 can be varied to adjust for the space resolution. The two rigid segments are connected with a hinge 11 in FIGS. 2 (a) and 2 (b) which allows rotation only in the plane that includes the two opposite grooves of the inclinometer casing or the FBG's. A 3-dimensional numerical simulated view of the DH-FBG-SD 12 is shown in FIG. 2 (c). Or, the DH-FBG-SD is designed to monitor ground movement only in the plane where the rigid segments are allowed to rotate or deflect. The distortion of the inclinometer casing 13 induced by ground movement causes relative rotation between the rigid segments of the inserted DH-FBG-SD as shown in FIG. 3. This relative rotation creates bending to the flexible tube which behaves as a cantilever. The bending in turn, causes flexural strains to the FBG's attached to the surface of the flexible tube. The design assures that the flexible tube responds to rotation between the rigid segments only. All longitudinal forces carried by the rigid segments are transmitted through the hinge 11 in FIG. (a) and (b).

The DH-FBG-SD may be used as a general purpose tool to monitor the deformation of a linear structure. These structures may include oil or water pipelines, columns or beams of bridges, ships or other types of civil/infrastructures. The monitoring can be implemented by first attaching an inclinometer casing 13 in FIG. 4, to the structure to be monitored 14 and then inserting the DH-FBG-SD into the casing. For field installation, the DH-FBG-SD units are connected together to form a string as it is inserted into the inclinometer casing.

Advantages of the double hinged segmented deflectometer include:
1. The monitoring probe is compatible with the conventional inclinometer casings. The technique of inclinometer installation is well established. The design allows the inclinometer to be installed first and then the DH-FBG-SD is inserted.
2. The DH-FBG-SD is placed inside the inclinometer casing and thus protected from the potentially harsh environment.
3. The DH-FBG-SD can be left in place for long term, automated monitoring.
4. The DH-FBG-SD uses strain sensors attached to a flexible tube to measure deflection. Its sensitivity and range can be adjusted by varying the diameter of the flexible tube.

BRIEF DESCRIPTION OF THE DRAWINGS

FIGS. 1(a) and 1(b) describe the prior art principles of pipe strain gauge in that FIG. 1(a) is a displacement diagram and FIG. 1(b) is a strain diagram; FIG. 1(c) shows the schematic view of the bend meter;

FIGS. 2 (a) and 2(b) show the top and side view respectively, of the double hinged segmented deflectometer; FIG. 2(c) depicts a numerically simulated 3-dimensional view of the double hinged segmented deflectometer;

FIG. 6 depicts photographs of laboratory set up in calibrating the DH-FBG-SD against the conventional inclinometer probe;

DETAILED DESCRIPTION OF THE PREFERRED EMBODIMENTS

Figure 3:
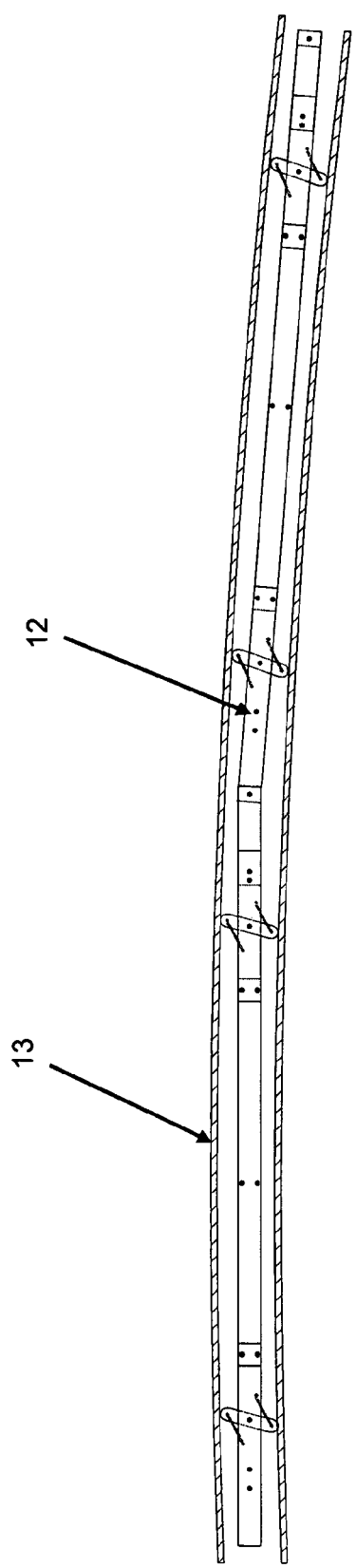
FIG. 3 demonstrates the signal amplification effect of the segmented deflectometer when used inside of an inclinometer casing.
Figure 4:
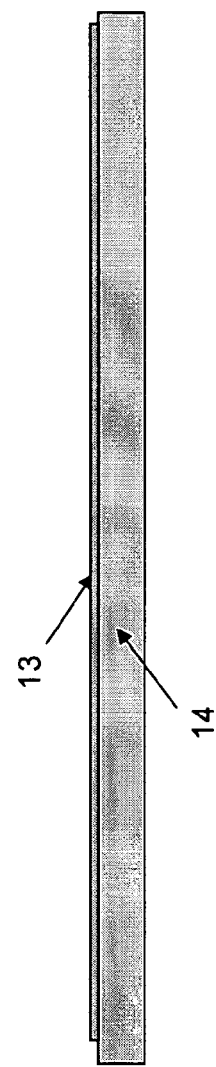
FIG. 4 shows a schematic view of using the DH-FBG-SD to monitor the deformation of a linear structure.

The double hinged fiber Bragg grating segmented deflectometer (DH-FBG-SD) of the invention is intended to be used together with an inclinometer casing. For monitoring ground displacement, the inclinometer casing is grouted inside of a borehole in the ground. This procedure is similar to the convention method for using an inclinometer casing and the inclinometer probe (IP), except that the distortion of the inclinometer casing due to ground displacement is sensed by using the DH-FBG-SD. The components of the DH-FBG-SD are shown in FIGS. 2 (a), 2 (b) and 2 (c). The monitoring device of the invention uses a flexible tube 06 with a length of 215 mm and 12 mm in diameter, which can be made of plastic, as a carrier of strain sensors. A pair of strain sensors which can be fiber Bragg gratings 09 are attached to the two opposite sides of the flexible tube 06 to measure the flexural strain experienced by the flexible tube. The ends of the flexible tube are connected to rigid segments 07 which can be made of aluminum or other types of rigid material. One end of the flexible tube is fixed to a rigid segment where no sliding or rotation is allowed. The other end of the flexible tube is supported on the neighboring rigid segment with a pin 15 fitted in an elongated slot 16 in FIG. 2 (b) where longitudinal sliding and rotation are allowed. Because the pin supported end of the flexible tube is free to slide longitudinally, the weight of DH-FBG-SD elements and friction between the brace and the casing grooves would have no effect on the flexural strains. The DH-FBG-SD allows rotations to occur only at the hinge 11 in FIGS. 2 (a) and 2 (b), thus creating an effect of signal amplification when placed inside of the inclinometer casing as shown in FIG. 3.

Figure 5:
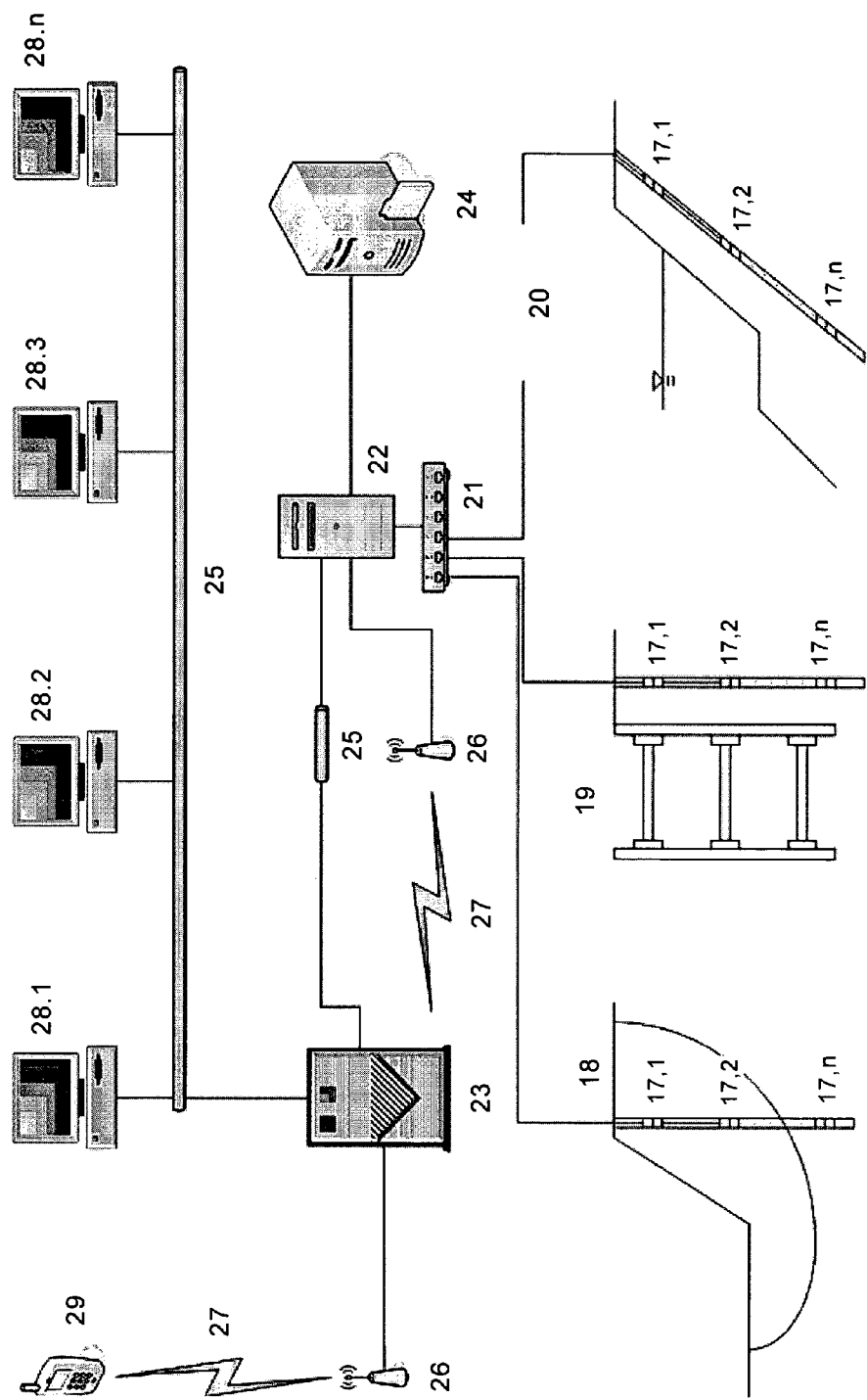
FIG. 5 shows the field system configuration when using the DH-FBG-SD for automated monitoring.

The DH-FBG-SD can be applied to monitor deformation for many types of civil engineering systems, such as stability monitoring of dikes, deformation monitoring of the supporting structure during ground excavation, deformation of bridge decks and pipelines. The monitoring can be automated as shown in FIG. 5. Multiple units of DH-FBG-SD are connected together to form a string 17 and then inserted in the inclinometer casing. The conventional IP can only be used in inclinometer casings in a near vertical position as IP measures inclination angle against verticality and it has a limited range. An important advantage of the DH-FBG-SD is that it can be used horizontally, vertically, or on in any angle of inclination as the DH-FBG-SD measures relative deflections. For the diagram shown in FIG. 5, the DH-FBG-SD may be deployed for monitoring the stability of earth slopes 18, braced excavation 19, and river dikes 20. The total number and distance interval of the DH-FBG-SD units can be adjusted according to the nature of the subject to be monitored. For the current design, the space interval between the DH-FBG-SD units should be no less than 500 mm. The DH-FBG sensor signals are transmitted through an optical switches 18 and an DH-FBG interrogator 19, and then distributed using a computer server 20 or a file server 21 and internet 22 or via a wireless system 23 such as the general packet radio service 24, finally reaching to a network 24 of computers 25 reside in offices where the results are analyzed and reported. The FBG interrogator provides the light source for FBG's and determines the wavelength variations of the reflected light signals from the FBG's. For emergencies, messages may be dispatched from the server to The following sections describe the cases of laboratory and field applications of the DH-FBG-SD.

Embodiment 1

A Laboratory Demonstration

To demonstrate the effectiveness of the DH-FBG-SD as a means to monitor ground movement, a series of experiments were conducted in the laboratory under controlled conditions. Two, 9-m long inclinometer casings were tied together with steel blocks to assure these casings have the same mount of lateral movements. The inclinometer casings were set up vertically against a stairway that was attached to a 3-m thick concrete reaction wall in a structural testing laboratory. A total of eight DH-FBG-SD units were connected together to form a string and inserted into one of the inclinometer casings. An IP was lowered in the other casing to establish the IP initial readings. The two inclinometer casings were then forced to deform simultaneously by pushing the steel blocks against the stairway. Upon fixing the casings in their deformed position, the DH-FBG-SD and IP readings were taken again. Once inserted, the DH-FBG-SD's were left in place throughout the experiment; readings were taken simply by connecting the optic cables directly to the interrogator. For the IP, the probe was first lowered to the bottom and then raised in 500 mm intervals to take readings.

Figure 7:
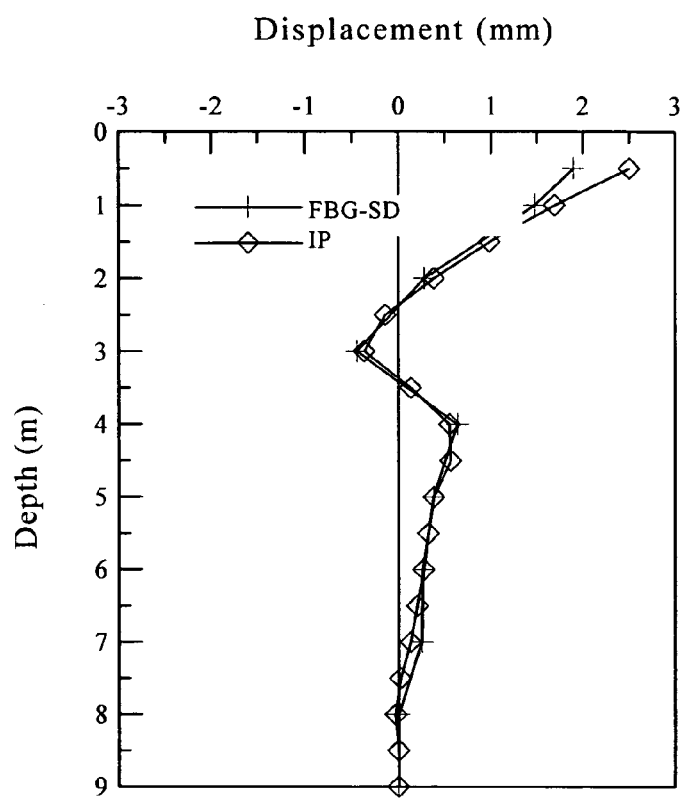
FIG. 7 compares the results from DH-FBG-SD and inclinometer probe with 2.5 mm maximum deformation.
Figure 8:
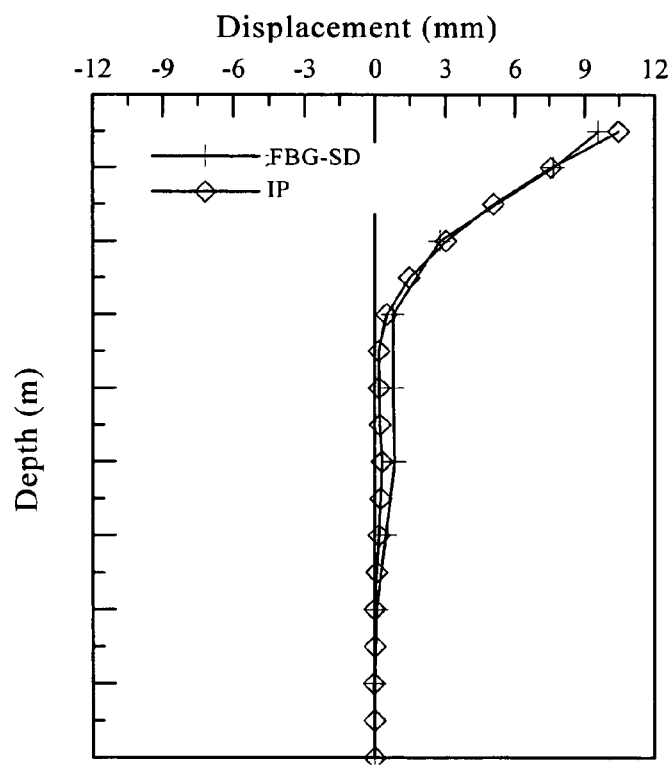
FIG. 8 compares the results from DH-FBG-SD and inclinometer probe with 12 mm maximum deformation.

A comparison between the results from DH-FBG-SD and IP for various types and magnitudes of deformations are shown in FIGS. 7 and 8. The maximum difference between the DH-FBG-SD and IP measurements in these indoor experiments did not exceed 10%.

Embodiment 2

Safety Monitoring of a River Dike

Figure 9:
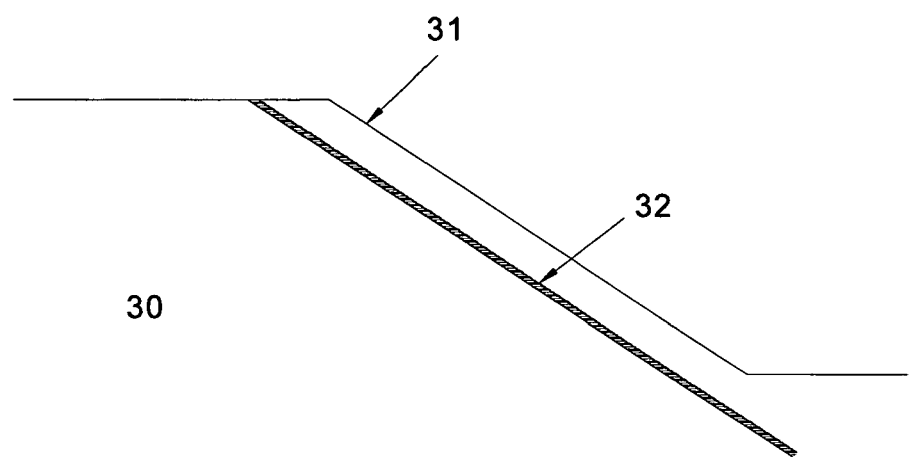
FIG. 9 describes the field set up in the use of DH-FBG-SD to monitor the stability of a Yellow River dike.

The inventor has applied the newly invented DH-FBG-SD as a means to monitor the integrity of a Yellow river dike. The test site was located at dike No. 24 in Wu-Tze County, Honan Province, China. A string of DH-FBG-SD with a total length of 8 m was inserted into an inclinometer casing 34 in FIG. 9. The inclinometer casing was installed at an angle of 45 degrees, 2 m from the edge and parallel to the surface of the river dike 33 in FIG. 9.

Figure 10:
FIG. 10 shows a side view of the rock pile in the test to verify the effectiveness of DH-FBG-SD to monitor the stability of a Yellow River dike.
Figure 11:
FIG. 11 shows a top view of the rock pile in the test to verify the effectiveness of DH-FBG-SD to monitor the stability of a Yellow River dike.

Soil erosion from the dike surface should result in an unloading condition and cause deformation to the DH-FBG-SD sensor probe if the monitoring system performs properly. The sensor probe was embedded inside the dike body and thus not likely to be damaged by the dike surface erosion. The effectiveness of the design concept and sensitivity of the sensor system were verified by loading and subsequent unloading simulations on the dike surface. A 2-m wide wedge shaped pile of rock was formed along the face of the dike slope first to a maximum height of 2 m and then removed in stages as described in FIGS. 10 and 11. The sensor readings were taken as the rock pile was formed and removed.

Figure 12:
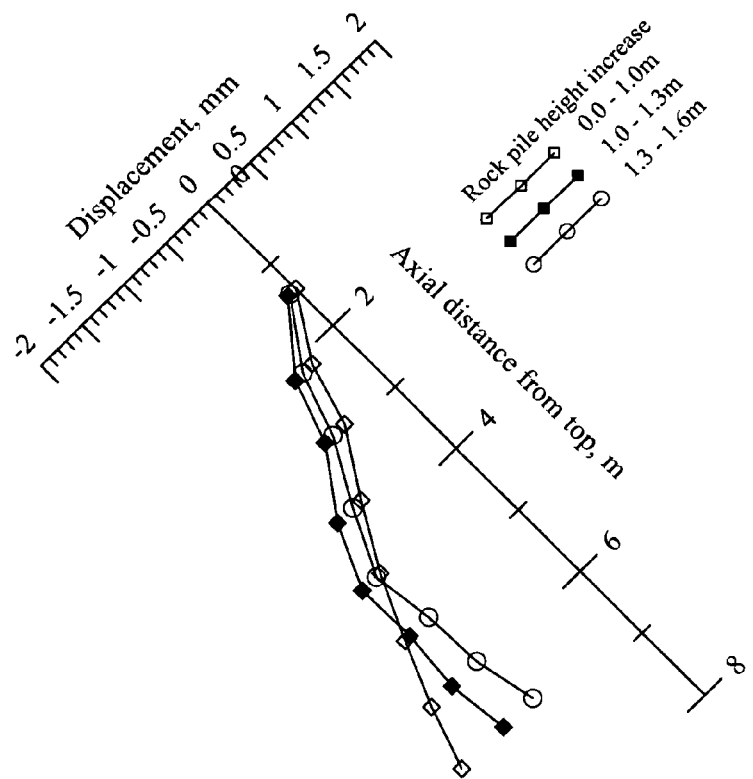
FIG. 12 shows the deformation versus depth during the loading stage of the field test according to DH-FBG-SD readings.
Figure 13:
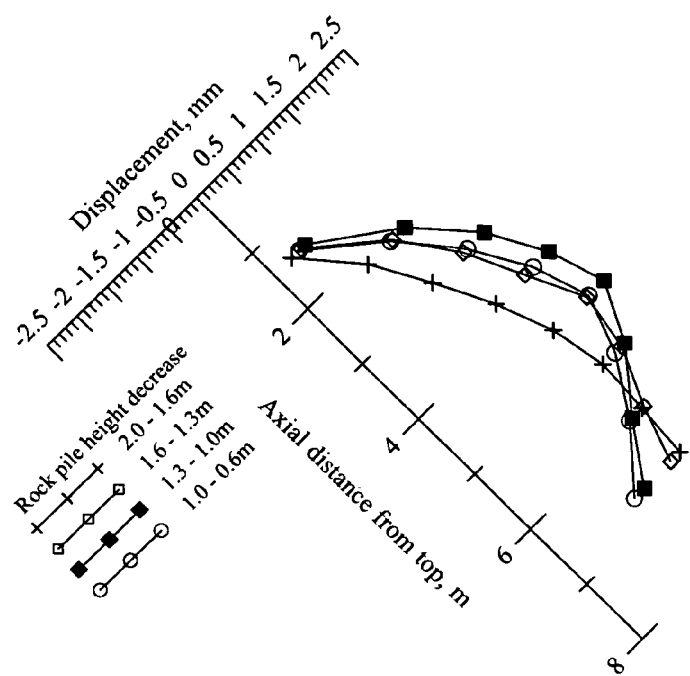
FIG. 13 shows the deformation versus depth during the unloading stage of the field test according to FBG-SD readings.

FBG readings were recorded in terms of the wavelength variations. These changes were converted into the degree of rotation of each DH-FBG-SD following the calibration correlations between the wavelength variation and degree of rotation. Accumulating the rotation angles and summing the displacement in the direction perpendicular to the axis of the inclinometer casing yielded the displacement profile. Ground displacement according to FBG measurements at various stages of loading and unloading are shown in FIGS. 12 and 13, respectively. The results show substantial agreement quantitatively and in trend ground movement according to numerical simulations.

Embodiment 3

Deformation Monitoring of a Diaphragm Wall During a Deep Excavation

The DH-FBG-SD system was to monitor the deformation of a 1.2-m thick, 15-m deep diaphragm wall during an internally braced deep excavation project in Beitou district of Taipei, Taiwan. The 8.1-deep excavation covered a square area of 100 m by 100 m, and was braced by two levels of cross lot struts. Two, 14-m deep inclinometer casings spaced at 1 m were tied to the reinforcement cage and then fixed inside of the diaphragm wall upon tremie concrete. A string of 11DH-FBG-SD's was inserted into one of the inclinometer casings leaving the other casing for IP measurements.

Figure 14:
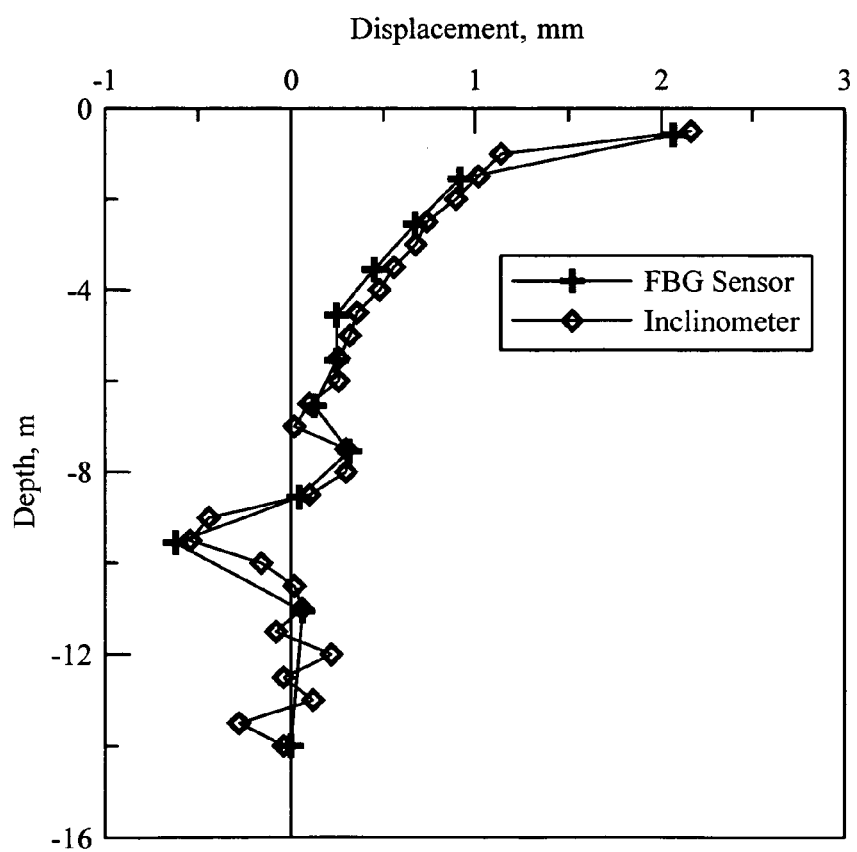
FIG. 14 shows deformation measurements of the diaphragm wall from DH-FBG-SD and conventional inclinometer probe during a braced excavation.

FIG. 14 shows the lateral movement induced by pre-loading of the second level struts when the excavation reached 5.8 m. The pre-loading pushed the diaphragm wall outwards by as much as 2 mm. As in the case of indoor experiments, the ground movements according to DH-FBG-SD's were very similar to those of IP readings.

Though the invention has been described in connection with the preferred embodiments thereof, however, changes and modifications to the details of the above-described embodiments without departing from the underlying principles of the invention may be applied in the future. The scope of the invention should, therefore, be determined only by the following claims.

LIST OF REFERENCE NUMERALS 01 sliding direction
02 sliding face
03 stretched fiber Bragg grating
04 bearing
05 rigid column
06 flexible tube
07 end piece
08 spring
09 brace
10 fiber Bragg grating 11 hinge
12 the double hinged FBG segmented deflectometer (DH-FBG-SD)
13 inclinometer casing
14 structure to be monitored
15 pin
16 elongated slot
17 string of DH-FBG-SD
18 earth slope
19 braced excavation
20 river dikes
21 optical switch
22 FBG interrogator
23 server
24 file server
25 internet
26 universal packet radio service
27 wireless system
28 computer
29 mobile phone
30 river dike body
31 dike surface
32 inclinometer casing with DH-FBG-SD

What is claimed is:

1. A double hinged fiber Bragg grating sensored segmented deflectometer for observing deformation in soil or rock mass, comprising:
    a flexible tube connected to two aluminum rigid segment end pieces; and
    the rigid segment end pieces are equipped with spring loaded braces so that the deflectometer is fitted to two oppositely arranged grooves in an inclinometer casing, wherein one end of the flexible tube is fixed to one of said rigid segment end pieces so that no sliding or rotation is allowed, the other end of the flexible tube is supported on the second of said rigid segment end pieces with a pin fitted in an elongated slot in said flexible tube so that longitudinal sliding and rotation are allowed.

2. The deflectometer according to claim 1, wherein the rigid segment end pieces are connected with a hinge which allows rotation only in the plane that includes the two opposite grooves of the inclinometer casing.

3. The deflectometer according to claim 1, wherein the flexible tube is made of plastic, or other elastic composite material or metal, and the cross section is round or polygonal shape having one or more symmetrical sides.

4. The deflectometer according to claim 1, wherein a flexural deformation of the flexible tube is measured by fiber Bragg grating, other types of fiber optic strain sensors or strain gauges.

5. The deflectometer according to claim 1, wherein the inclinometer casing is directly grouted in a borehole.

6. The deflectometer according to claim 1, wherein the deflectometer is suitable for monitoring deformation of many types of civil engineering systems including stability of dikes, ground deformation surrounding ground excavation and deformation of bridge decks, pipelines and other types of long structures.

7. The deflectometer according to claim 6, wherein the deflectometer is fitted inside an inclinometer casing when used to monitor above ground structures comprising oil tanks, pipelines or bridge decks, furthermore, the inclinometer casing can be mounted on the structure to be monitored first and then the deflectometer are inserted.

8. The deflectometer according to claim 6, wherein the total number and distance interval of deflectometer units can be adjusted according to the nature of type of civil engineering system to be monitored.

9. A process of field installation of the deflectometer according to claim 1, comprising:
    connecting multiple units of deflectometers together to form a string; and
    inserting the assembled string into the inclinometer casing, wherein relative rotation of the rigid segment end pieces creates bending of the flexible tube which behaves as a cantilever; the bending in turn, causes flexural strains to the fiber Bragg gratings attached to the surface of the flexible tube; and the distribution of ground displacement is then computed based on measurements of the relative rotation.

* * * * *